United States Patent
Kang et al.

(10) Patent No.: US 7,355,960 B2
(45) Date of Patent: Apr. 8, 2008

(54) CHANNEL ESTIMATION APPARATUS AND METHOD FOR ADAPTIVE CHANNEL ALLOCATION IN AN ORTHOGONAL FREQUENCY DIVISION MULTIPLE ACCESS SYSTEM

(75) Inventors: Hyun-Jeong Kang, Seoul (KR);
Chang-Hoi Koo, Seongnam-si (KR);
Jung-Je Son, Seongnam-si (KR);
Bongseog Jang, Jeollanam-do (KR)

(73) Assignee: Samsung Electronics Co., Ltd (KR)

( * ) Notice: Subject to any disclaimer, the term of this patent is extended or adjusted under 35 U.S.C. 154(b) by 662 days.

(21) Appl. No.: 10/998,318

(22) Filed: Nov. 26, 2004

(65) Prior Publication Data

US 2005/0111492 A1    May 26, 2005

(30) Foreign Application Priority Data

Nov. 26, 2003   (KR) .................... 10-2003-0084586

(51) Int. Cl.
*H04J 11/00*     (2006.01)
(52) U.S. Cl. ...................... 370/208; 370/480
(58) Field of Classification Search .................... None
See application file for complete search history.

(56) References Cited

U.S. PATENT DOCUMENTS 6,473,467 B1 * 10/2002 Wallace et al. ............. 375/267
6,751,187 B2 *  6/2004 Walton et al. .............. 370/210

OTHER PUBLICATIONS

Fitzek et al, Channel State Dependent Scheduling Policies for an OFDM Physical Layer using a Binary State Model, Technical University Berlin Telecommunication Networks Group, pp. 1-34, Jun. 2001.*

* cited by examiner

*Primary Examiner*—Frank Duong
(74) *Attorney, Agent, or Firm*—The Farrell Law Firm, PC (57) ABSTRACT

A method and apparatus for defining at least one subcarrier as a subchannel, dividing a total frequency band into a plurality of subchannels, and allocating the subchannels to at least one mobile station in an OFDMA mobile communication system. The method includes receiving channel state information; comparing the received channel state information with a predetermined threshold, calculating an average occurrence length of a case in which the received channel state information is greater than the threshold, calculating a state hold prediction value, calculating an estimation value, sorting the calculated estimation values according to subchannels in order of their levels, and allocating subchannels according to the at least one mobile station in the sorted order.

22 Claims, 7 Drawing Sheets

CHANNEL ESTIMATION APPARATUS AND METHOD FOR ADAPTIVE CHANNEL ALLOCATION IN AN ORTHOGONAL FREQUENCY DIVISION MULTIPLE ACCESS SYSTEM

PRIORITY

This application claims priority under 35 U.S.C. § 119 to an application entitled "Channel Estimation Apparatus and Method for Adaptive Channel Allocation in an Orthogonal Frequency Division Multiple Access System" filed in the Korean Intellectual Property Office on Nov. 26, 2003 and assigned Serial No. 2003-84586, the content of which is incorporated herein by reference.

BACKGROUND OF THE INVENTION

1. Field of the Invention

The present invention relates generally to a mobile communication system, and in particular, to an apparatus and method for allocating subchannels to a plurality of mobile stations in a mobile communication system using Orthogonal Frequency Division Multiple Access (OFDMA) scheme.

2. Description of the Related Art

Currently, a mobile communication system is evolving from a $3^{rd}$ generation (3G) mobile communication system into a $4^{th}$ generation (4G) mobile communication system. The 4G mobile communication system targets efficient interworking and integration of services between a wired communication network and a wireless communication network beyond the simple radio communication services supported by the earlier-generation mobile communication system. In the 4G mobile communication system, standardization is being conducted on the technologies for providing a higher rate data transmission service than that provided in the 3G mobile communication system.

In the mobile communication systems, when a signal is transmitted over a radio channel, the transmission signal suffers multipath interference due to various obstacles located between a transmitter and a receiver. The radio channel having multiple paths is characterized by maximum delay spread of the channel and a transmission period of a signal. When the transmission period of a signal is longer than the maximum delay spread, no interference occurs between consecutive signals, and a frequency characteristic of the channel is given as nonselective fading.

However, when a single-carrier scheme is used for high-speed data transmission having a short symbol period, distortion occurs due to intersymbol interference (ISI), thereby causing an increase in the complexity of an equalizer of a receiver.

Therefore, a system using Orthogonal Frequency Division Multiplexing (OFDM) scheme has been proposed as an alternative for solving an equalization problem in the single-carrier transmission scheme. OFDM is a transmission scheme using multiple carriers, and is a kind of Multi-Carrier Modulation (MCM) in which a serial input symbol sequence is converted into parallel symbol sequences and then modulated with mutually orthogonal subcarriers, or subchannels, before being transmitted.

The first MCM systems appeared in the late 1950s for military high frequency radio communication, and OFDM with overlapping orthogonal subcarriers was initially developed in the 1970s. In view of orthogonal modulation between multiple carriers, OFDM has limitations in actual implementation for systems. In 1971, Weinstein et al. proposed an OFDM scheme that applies DFT (Discrete Fourier Transform) to parallel data transmission as an efficient modulation/demodulation process, which was a driving force for the development of OFDM. Further, the introduction of a guard interval and a cyclic prefix as the guard interval mitigates adverse effects of multipath propagation and delay spread on systems.

Accordingly, OFDM has widely been used for digital data communications such as Digital Audio Broadcasting (DAB), Digital TV Broadcasting, Wireless Local Area Network (WLAN), and Wireless Asynchronous Transfer Mode (W-ATM). Although hardware complexity was an obstacle to widespread use of OFDM, recent advances in digital signal processing technologies including FFT (Fast Fourier Transform) and IFFT (Inverse Fast Fourier Transform) enable the OFDM implementation.

OFDM, similar to the existing FDM (Frequency Division Multiplexing), boasts of optimum transmission efficiency in high-speed data transmission because it transmits data on subcarriers, while maintaining orthogonality among the subcarriers. The optimum transmission efficiency is further attributed to good frequency use efficiency and robustness against multipath fading in OFDM.

More specifically, overlapping frequency spectrums lead to efficient frequency use and robustness against frequency selective fading and multipath fading. OFDM reduces the effects of the ISI by using guard intervals and enables design of a simple equalizer hardware structure. Further, because OFDM is robust against impulse noise, it is increasingly popular in communication systems.

Figure 1:
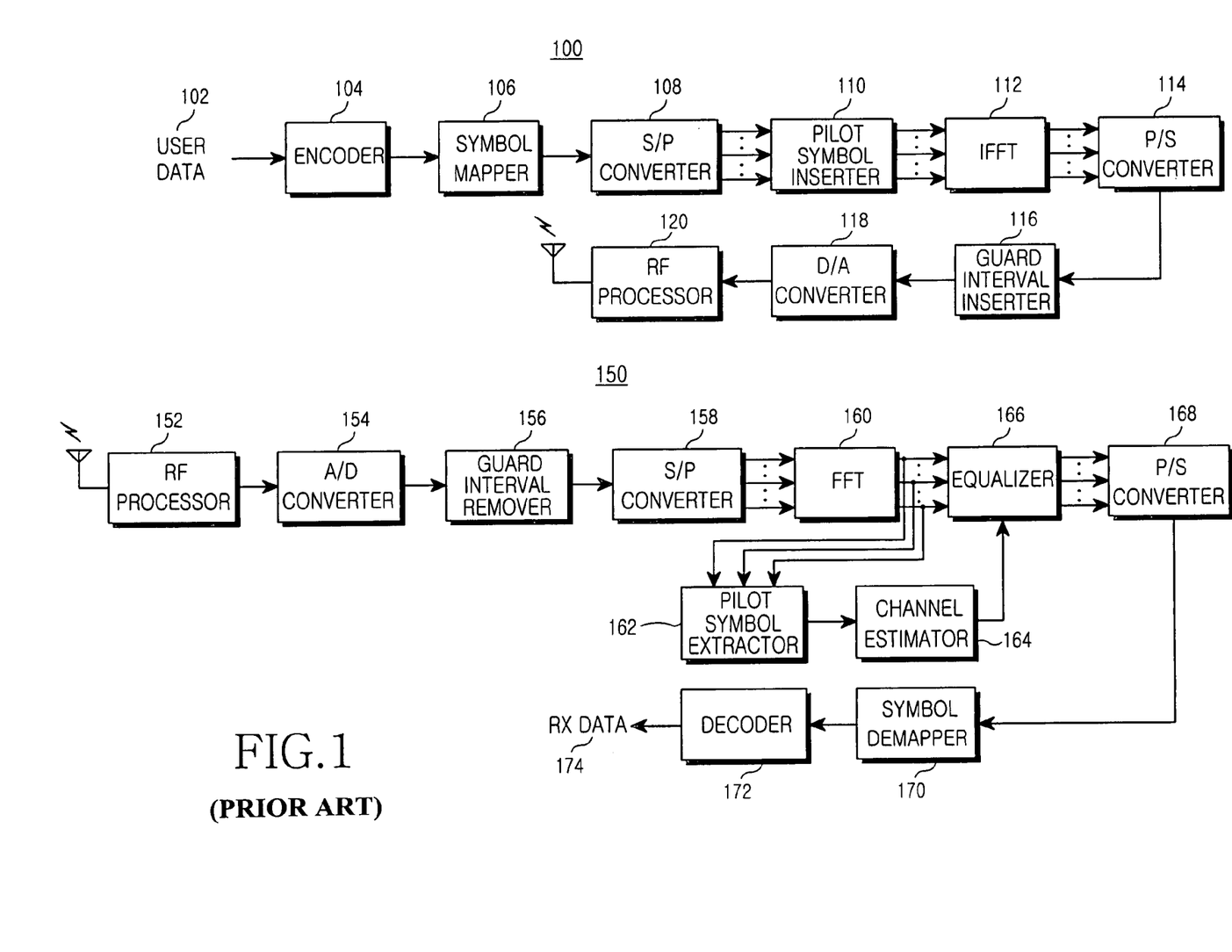
FIG. 1 is a block diagram illustrating a transmitter/receiver in a conventional OFDM mobile communication system.

FIG. 1 is a block diagram illustrating a transmitter (100)/receiver(150) in a conventional OFDM mobile communication system.

The transmitter 100 includes an encoder 104, a symbol mapper 106, a serial-to-parallel (S/P) converter 108, a pilot symbol inserter 110, an IFFT module 112, a parallel-to-serial (P/S) converter 114, a guard interval inserter 116, a digital-to-analog (D/A) converter 118, and a radio frequency (RF) processor 120. In the transmitter 100, user data 102 including user data bits and control data bits to be transmitted is input to the encoder 104. The encoder 104 codes the user data using a corresponding coding scheme, and outputs the coded user data to the symbol mapper 106. The coding scheme includes a turbo coding scheme and a convolutional scheme having a predetermined coding rate. The symbol mapper 106 modulates coded bits output from the encoder 104 into modulation symbols using a corresponding modulation scheme, and outputs the modulation symbols to the S/P converter 108.

The modulation scheme includes BPSK (Binary Phase Shift Keying), QPSK (Quadrature Phase Shift Keying), 16 QAM (16-ary Quadrature Amplitude Modulation), or 64 QAM (64-ary Quadrature Amplitude Modulation).

The S/P converter 108 parallel-converts serial modulation symbols output from the symbol mapper 106, and outputs the parallel-converted modulation symbols to the pilot symbol inserter 110. The pilot symbol inserter 110 inserts pilot symbols into the parallel-converted symbols, and outputs the pilot-inserted symbols to the IFFT module 112. The IFFT module 112 performs N-point IFFT on the signals output from the pilot symbol inserter 110, and outputs the IFFT-processed signals to the P/S converter 114.

The P/S converter 114 serial-converts the signals output from the IFFT module 112, and outputs the serial-converted signal to the guard interval inserter 116. The guard interval inserter 116 inserts a guard interval signal into the signal output from the parallel-to-serial converter 114, and outputs the guard interval-inserted signal to the D/A converter 118. The guard interval is inserted to remove interference between a previous OFDM symbol transmitted at a previous OFDM symbol time and a current OFDM symbol transmitted at the current OFDM symbol time in the OFDM communication system.

The guard interval has been proposed as a method for inserting null data for a predetermined interval. However, in the method for transmitting null data for the guard interval, when a receiver incorrectly estimates a start point of an OFDM symbol, interference occurs between subcarriers, thereby increasing false-alarm probability of a received OFDM symbol.

In order to solve this problem, one of the following two method is used: (1) a 'cyclic prefix' method for copying a predetermined number of last bits of an OFDM symbol in a time domain and inserting the copied bits into a valid OFDM symbol, and (2) a 'cyclic postfix' method for copying a predetermined number of first bits of an OFDM symbol in a time domain and inserting the copied bits into a valid OFDM symbol.

The D/A converter 118 analog-converts the signal output from the guard interval inserter 116, and outputs the analog-converted signal to the RF processor 120. The RF processor 120, including a filter and a front-end unit, RF-processes the signal output from the D/A converter 118, and transmits the RF-processed signal via a transmission antenna.

The receiver 150 has a reverse structure of the transmitter 100. The receiver 150 includes an RF processor 152, an analog-to-digital (A/D) converter 154, a guard interval remover 156, a serial-to-parallel (S/P) converter 158, an FFT module 160, a pilot symbol extractor 162, a channel estimator 164, an equalizer 166, a parallel-to-serial (P/S) converter 168, a symbol demapper 170, and a decoder 172. The signal transmitted from the transmitter 100 is received via a reception antenna of the receiver 150. The transmitted signal experiences a multipath channel and has a noise component.

The signal received via the reception antenna is input to the RF processor 152, which down-converts the signal into an intermediate frequency (IF) signal, and outputs the IF signal to the A/D converter 154. The A/D converter 154 digital-converts the signal output from the RF processor 152, and outputs the digital-converted signal to the guard interval remover 156.

The guard interval remover 156 removes a guard interval signal from the signal output from the A/D converter 154, and outputs the guard interval-removed signal to the S/P converter 158. The S/P converter 158 parallel-converts the serial signal output from the guard interval remover 156, and outputs the parallel-converted signals to the FFT module 160. The FFT module 160 performs N-point FFT on the signals output from the serial-to-parallel converter 158, and outputs the FFT-processed signals to the equalizer 166 and the pilot symbol extractor 162.

The equalizer 166 channel-equalizes the signals output from the FFT module 160, and outputs the channel-equalized signals to the P/S converter 168. The P/S converter 168 serial-converts the parallel signals output from the equalizer 166, and outputs the serial-converted signal to the symbol demapper 170.

Further, the signal output from the FFT module 160 is input to the pilot symbol extractor 162. The pilot symbol extractor 162 extracts pilot symbols from the signal output from the FFT module 160, and outputs the extracted pilot symbols to the channel estimator 164. The channel estimator 164 channel estimates the pilot symbols output from the pilot symbol extractor 162, and outputs the channel estimation result to the equalizer 166.

In addition, the receiver 150 generates channel quality information (CQI) corresponding to the channel estimation result of the channel estimator 164, and transmits the generated CQI to the transmitter through a channel quality information transmitter (not shown).

The symbol demapper 170 demodulates the signal output from the P/S converter 168 using a corresponding demodulation scheme, and outputs the demodulated signal to the decoder 172. The decoder 172 decodes the signal output from the symbol demapper 170 using a corresponding decoding scheme, and outputs the decoded signal as a final reception signal 174. The demodulation scheme and the decoding scheme correspond to the modulation scheme and the coding scheme used by the transmitter 100.

The OFDM-based system can also use Orthogonal Frequency Division Multiple Access (OFDMA) for multiuser access control. In OFDMA, users can use subsets of OFDM subcarriers using Frequency Hopping (FH) for spectrum spreading, and each subcarrier is exclusively allocated to one user each time. In this environment, radio resource allocation for performance optimization of the OFDMA system is very important.

In the OFDM mode, the most basic unit for resource allocation is an OFDM symbol, and the number of bits transmitted by one symbol is determined by the number of data carriers used per symbol, and also by modulation and coding schemes. In the OFDMA mode, the most basic resource allocation unit becomes a subchannel. Each OFDM symbol uses a multiple of subchannels according to a size of the FFT, and the number of data bits used per subchannel, which can be transmitted by each subchannel, is equal to the number of data carriers used per subchannel.

It is well known that in a wireless communication system having the OFDM-based physical structure, using channel state information secures effective application of an OFDMA system. However, the conventional channel allocation method is realized in a method of attempting channel allocation using a signal-to-noise ratio (SNR), which is measured for a predetermined time using state information of a radio channel.

Alternatively, as a simpler method, a method has been proposed for preferentially allocating the best channel using state information of a previous channel.

However, the conventional methods are disadvantageous in that an increase in the number of mobile stations causes an increase in overhead for exchanging channel information. In addition, if the number of mobile stations increases, the channel allocation method based on temporary SNR measurement shows the same performance as that of the existing random channel allocation method, thereby preventing efficient channel allocation.

SUMMARY OF THE INVENTION

It is, therefore, an object of the present invention to provide an apparatus and method for efficiently allocating subchannels to a plurality of mobile stations based on channel states of the mobile stations in an OFDMA mobile communication system.

It is another object of the present invention to provide an apparatus and method for efficiently allocating channel resources by probabilistically estimating state information of channels for mobile stations in an OFDMA mobile communication system utilizing Frequency Hopping.

It is further another object of the present invention to provide a channel allocation apparatus and method for reducing control information traffic for channel information exchange and reducing system complexity by probabilistically estimating state information of channels for mobile stations in an OFDMA mobile communication system utilizing Frequency Hopping.

In accordance with one aspect of the present invention, there is provided a method for defining at least one subcarrier as a subchannel, dividing a total frequency band into a plurality of subchannels, and allocating the subchannels to at least one mobile station in an Orthogonal Frequency Division Multiple Access (OFDMA) wireless communication system. The method comprises the steps of receiving channel state information of the subchannels from the at least one mobile station, comparing the received channel state information with a predetermined threshold, determining a number of cases in which the received channel state information is greater than the predetermined threshold, calculating an average occurrence length of the case in which the received channel state information is greater than the predetermined threshold, from the determined values separately stored for the subchannels for a predetermined period, calculating a state hold prediction value for a next state of which a channel state information is greater than the threshold, from the calculated average occurrence length and calculating an estimation value for the next state from the state hold prediction value and a current channel state value.

In accordance with another aspect of the present invention, there is provided an apparatus for defining at least one subcarrier as a subchannel, dividing a total frequency band into a plurality of subchannels, and allocating the subchannels to at least one mobile station in an Orthogonal Frequency Division Multiple Access (OFDMA) wireless communication system. The apparatus comprises a subchannel allocator for comparing channel state information received from the at least one mobile station with a predetermined threshold, determining a number of cases in which the received channel state information is greater than the predetermined threshold, estimating a channel state value for a next time from the determined number of cases stored for a predetermined period, and allocating the subchannels for the at least one mobile station.

In accordance with still another aspect of the present invention, there is provided a method for defining at least one subcarrier as a subchannel, dividing a total frequency band into a plurality of subchannels, allocating the subchannels to at least one mobile station, and receiving transmitted data using the allocated subchannels in an Orthogonal Frequency Division Multiple Access (OFDMA) wireless communication system. The method comprises the steps of comparing channel state information received from the at least one mobile station with a predetermined threshold, counting a number of cases in which the received channel state information is greater than the predetermined threshold, estimating a channel state value for a next time from the counted values stored for a predetermined period, receiving subchannel allocation information allocated for the at least one mobile station and selecting a subchannel allocated thereto from subchannels received through the received subchannel allocation information.

In accordance with still further another aspect of the present invention, there is provided an apparatus for defining at least one subcarrier as a subchannel, dividing a total frequency band into a plurality of subchannels, allocating the subchannels to at least one mobile station, and receiving transmitted data using the allocated subchannels in an Orthogonal Frequency Division Multiple Access (OFDMA) wireless communication system. The apparatus comprises a subchannel selector for comparing channel state information received from the at least one mobile station with a predetermined threshold, counting a number of cases in which the received channel state information is greater than the predetermined threshold, estimating a channel state value for a next time from the counted values stored for a predetermined period, receiving subchannel allocation information allocated for the at least one mobile station, and selecting a subchannel allocated thereto from subchannels received through the received subchannel allocation information.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail herein below with reference to the annexed drawings. In the following description, a detailed description of known functions and configurations incorporated herein has been omitted for conciseness.

The present invention proposes a radio channel allocation structure for an effective multimedia service in a wireless communication system based on Orthogonal Frequency Division Multiple Access (OFDMA), more specifically, Frequency Hopping-Orthogonal Frequency Division Multiple Access (FH-OFDMA).

In the FH-OFDMA system, a radio channel allocation scheme using Quality-of-Services (QoS) is basic technology necessary for increased system performance and efficient packet transmission. For channel allocation in the OFDMA system, the existing random allocation scheme is recently developing into an adaptive FH scheme. Accordingly, the present invention proposes a method for allocating channels by probabilistically estimating a time-varying characteristic of a radio channel signal, and performing adaptive channel allocation.

If a time-varying characteristic of a radio channel signal is probabilistically estimated according to an embodiment of the present invention, it is possible to increase a period of channel information acquisition for adaptive channel allocation. Therefore, the new channel allocation method reduces the number of exchanges of control information messages between a base station and mobile stations. In addition, although complexity of the system for performing channel allocation increases as the number of the mobile stations increases, if it is possible to increase a channel allocation period through probabilistic estimation, the new channel allocation method enables effective process in spite of the increase in complexity.

The present invention provides a scheme for implementing a multimedia service that enables QoS control by using effective management and control on radio channels in the 4G mobile communication system having an OFDM-based physical structure. More specifically, the FH-OFDMA system enables various adaptive allocation schemes in allocating radio resources. Therefore, the present invention allocates channel resources by probabilistically estimating channel state information in the FH-OFDMA system. Accordingly, it is possible to reduce control information traffic for channel information exchange, and to reduce system complexity. Therefore, it is possible to realize an effective radio resource allocation technique for the multimedia service.

In implementation, the present invention changes a variation in channel state into a probabilistic variation model in the method described below, and embeds the variation trend into the model. Accordingly, it is possible to increase a channel allocation period using channel state information. Therefore, generation frequency of channel station information will decrease, and an increase in such an interval provides the time during which channels can be allocated more appropriately, thereby minimizing performance deterioration caused by the increase in the number of the mobile stations.

The present invention can be applied to the FH-OFDMA system. Generally, a base station and at least one mobile station constitute an FH-OFDMA physical structure. The base station includes a module for performing OFDM encoding on subchannels allocated to the mobile stations. Each of the encoded subchannels is converted into an orthogonal signal by an IFFT (Inverse Fast Fourier Transform) module, and a guard interval (e.g., cyclic prefix) is added to the signal, before being transmitted in a modem. Each of the mobile stations digitizes a received signal, removes a guard interval added in the transmitter, and classifies an orthogonal signal into data of respective subchannels by an FFT (Fast Fourier Transform) module. Further, a subchannel selection module selects a subchannel allocated to the mobile station and decodes the selected subchannel.

Figure 2:
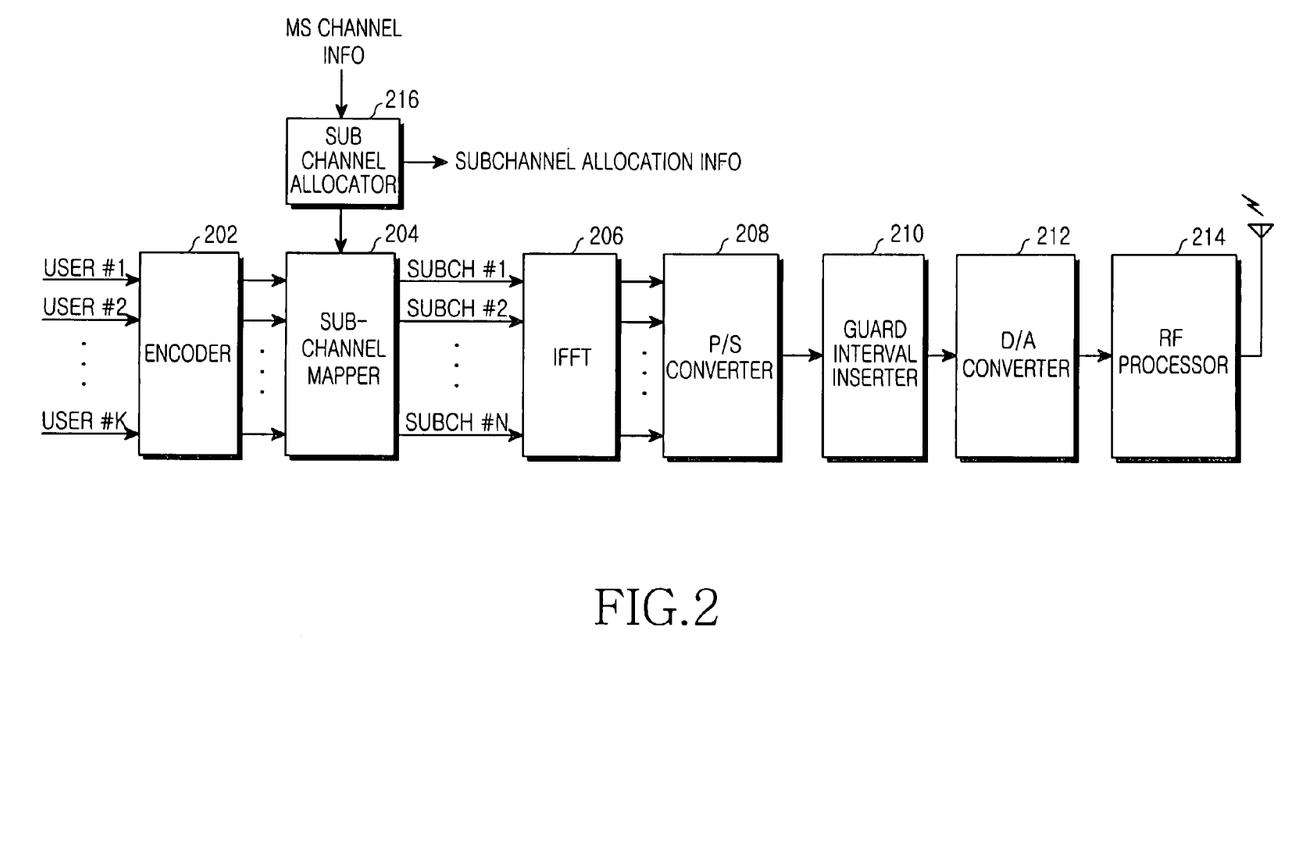
FIG. 2 is a block diagram illustrating a transmitter in an OFDMA system according to an embodiment of the present invention.

FIG. 2 is a block diagram illustrating a transmitter for allocating subchannels and transmitting data in an OFDMA system according to an embodiment of the present invention. Referring to FIG. 2, data to be transmitted to K mobile stations is mapped to input points of an IFFT module 206 by a subchannel allocator 216 and a subchannel mapper 204, which consider channel information of users according to the present invention. The data to be transmitted to the mobile stations, i.e., mapped to the input points of the IFFT module 206, is IFFT-processed by the IFFT module 206, and then transmitted to the mobile stations through a parallel-to-serial (P/S) converter 208, a guard interval inserter 210, a digital-to-analog (D/A) converter 212, and a radio frequency (RF) processor 214.

The P/S converter 208, the guard interval inserter 210, the D/A converter 214, and the RF processor 214 are identical in structure and operation to the corresponding elements described with reference to FIG. 1. Therefore, a detailed description thereof will be omitted herein.

The present invention adds an adaptive subchannel allocation algorithm to the conventional OFDMA system. That is, the transmission data for the mobile stations, coded by an encoder 202, is allocated to subchannels by the subchannel allocator 216 based on channel information received from the mobile stations. The allocated subchannel information is input to the subchannel mapper 204, and the transmission data for the mobile stations, coded by the encoder 202, is mapped to a plurality of subchannels, e.g., N subchannels, according to the received subchannel information.

The channel information received from the mobile stations includes channel state information between the base station and the mobile stations, and the channel state information can include, for example, a signal-to-noise ratio (SNR) or received signal power.

The subchannel, as described above, includes at least one subcarrier, and at least one subchannel can be mapped to each mobile station. For example, of the data to be transmitted to K mobile stations, data to be transmitted to a first mobile station can be mapped to a subchannel #1 and a subchannel #3, and data to be transmitted to a second mobile station can be mapped to a subchannel #2, a subchannel #6, and a subchannel #7. In this mapping method, subchannels are mapped to the transmission data by the subchannel allocator 216 according to the channel information received from the mobile stations. The method of allocating subchannels by the subchannel allocator 216 will be described in more detail below with reference to FIG. 4.

Subchannel allocation information allocated to the mobile stations should be transmitted to the respective mobile stations, and each of the mobile stations can demodulate only its own data through its subchannel allocation information. The subchannel allocation information, i.e., control information, can be transmitted to the mobile stations over separate subchannels or a broadcast channel, which is transmitted to all the mobile stations.

Figure 3:
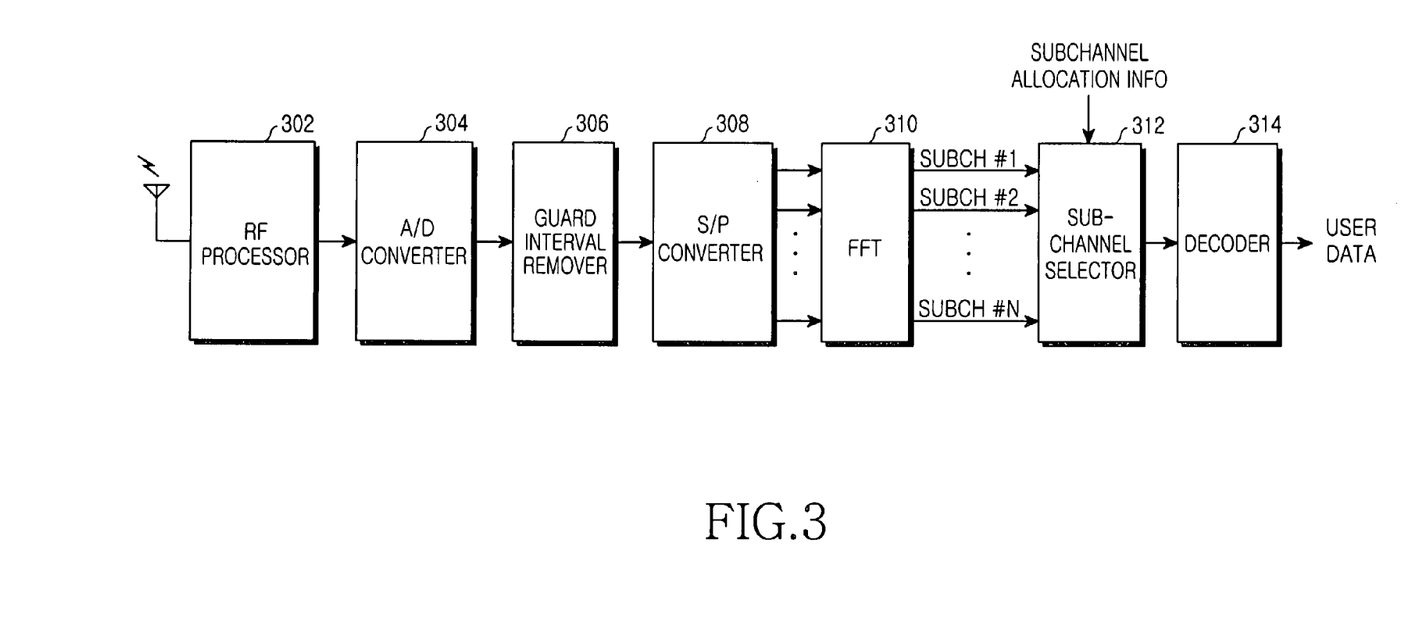
FIG. 3 is a block diagram illustrating a receiver in an OFDMA system according to an embodiment of the present invention.

FIG. 3 is a block diagram illustrating a receiver for receiving data over an allocated subchannel in an OFDMA system according to an embodiment of the present invention. Referring to FIG. 3, data transmitted by the transmitter of FIG. 2 is received via an antenna of the receiver, and then separated into a plurality of subchannel signals, for example, N, through an RF processor 302, an analog-to-digital (A/D) converter 304, a guard interval remover 306, a serial-to-parallel (S/P) converter 308, and an IFFT module 310. The RF processor 302, the A/D converter 304, the guard interval remover 306, the S/P converter 308, and the IFFT module 310 are identical in structure and operation to the corresponding elements described with reference to FIG. 1, so a detailed description thereof will be omitted.

A subchannel selector 312 receives a plurality of the subchannels obtained by separating the received data by the IFFT module 310 and selects a subchannel corresponding to the receiver using subchannel allocation information received from the transmitter. The selected subchannel signal is decoded by a decoder 314 using a decoding scheme corresponding to the coding scheme used by the encoder 202.

The subchannel allocation information input to the subchannel selector 312 is allocated using the channel information of mobile stations in the method described with reference to FIG. 2 according to an embodiment of the present invention, and is received from the transmitter. It is preferable to receive the subchannel allocation information at the same period as a subchannel allocation period T.

Alternatively, it is also possible to receive the subchannel allocation information each time the subchannel allocation information is changed.

Figure 4:
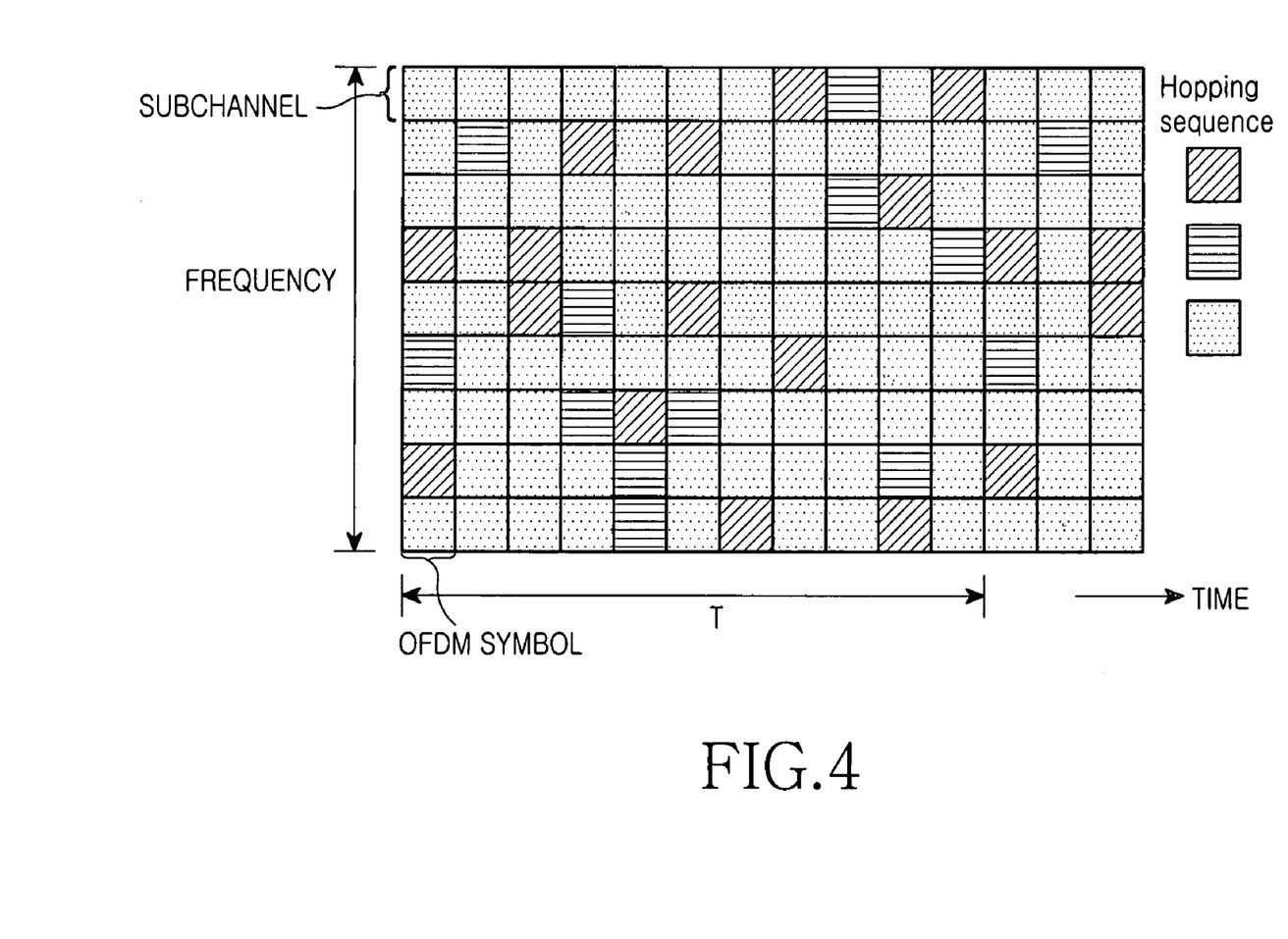
FIG. 4 is a diagram illustrating a subchannel allocation pattern in an OFDMA system according to an embodiment of the present invention.

FIG. 4 is a diagram illustrating a subchannel allocation pattern in an OFDMA system according to an embodiment of the present invention. The base station described in FIGS. 2 and 3 performs an FH sequence allocation process in the method illustrated in FIG. 4 for dynamic subchannel allocation.

Referring to FIG. 4, a signal spectrum is separated into subchannels based on the OFDM structure. FH patterns are generated for a time period T. For the next time period T, an FH pattern generated for the current time period T can be repeatedly generated or newly updated.

In FIG. 4, the FH pattern is repeatedly generated every T. However, when a new channel is allocated as channel information is changed every T according to the present invention, a channel allocation pattern for each mobile station is newly updated every T. This is, when a subchannel allocation algorithm operates every T, the FH pattern is determined based on channel allocation information generated as a result of the channel allocation. The subchannel allocation algorithm newly allocates a subchannel every T. In this case, the subchannel allocation algorithm appropriately allocates a subchannel according to a characteristic of service data based on a required bandwidth of each mobile station. The time period T illustrated in FIG. 4 can be adjusted according to a possible frame length defined in an actual system.

Figure 5:
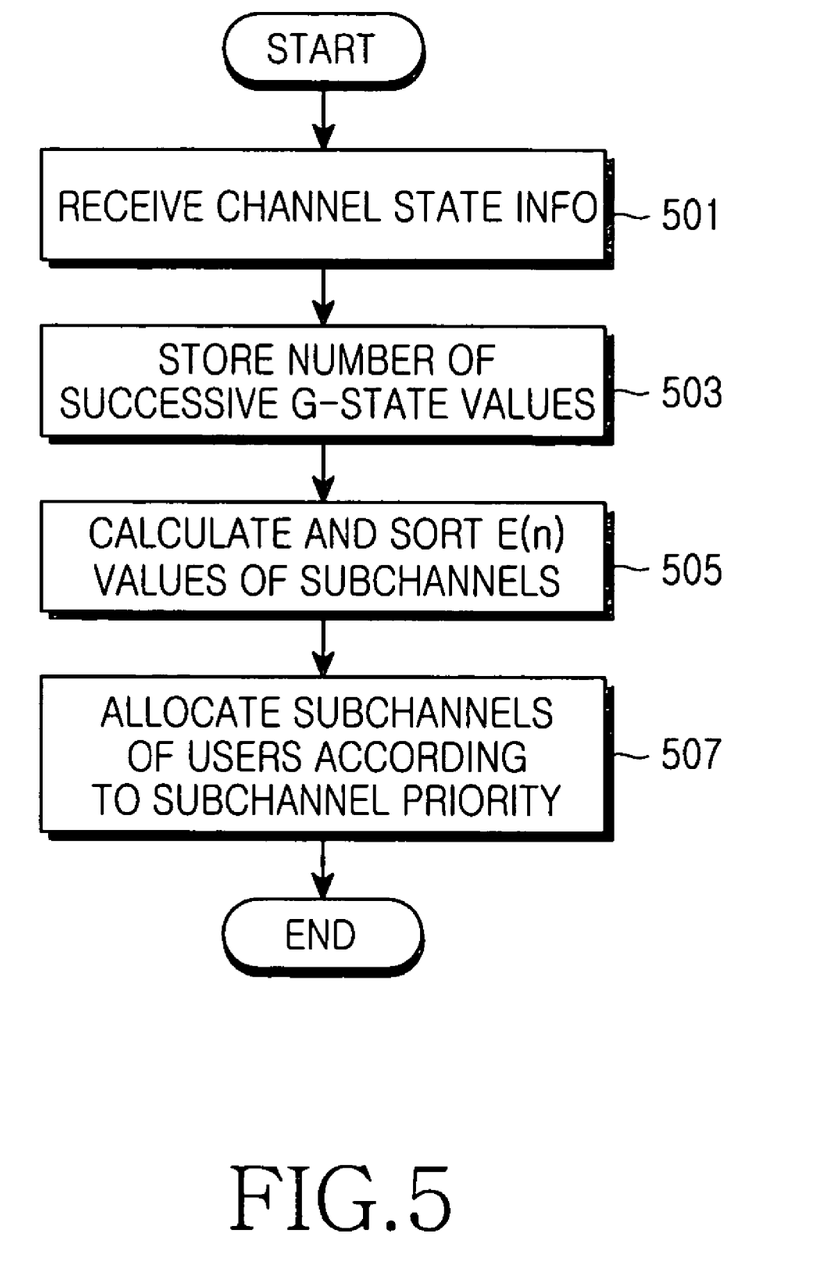
FIG. 5 is a flowchart illustrating a subchannel allocation procedure according to an embodiment of the present invention.

FIG. 5 is a flowchart illustrating a subchannel allocation procedure according to an embodiment of the present invention. Referring to FIG. 5, a base station receives channel state information of respective mobile stations in step 501. Herein, it is preferable to receive the channel state information every T, and the T can be identical to the subchannel allocation period T. In addition, the channel state information, as described above, can include an SNR or a signal power level.

The base station receiving the channel state information compares the channel state information of the mobile stations with a predetermined threshold, divides the channel state into a 'Good (G)' state value and a 'Bad (B)' state value according to the comparison result, and stores information on the number of successive G-state values among the state values in step 503.

Thereafter, the base station calculates estimated channel values E(n) of the mobile stations, to be currently allocated, for which previous state values of the mobile stations were reflected, using the information on the number of successive G-state values, and sorts subchannels according to the expected channel values in step 505.

Finally, the base station allocates subchannels to the mobile stations according to the calculated estimated channel values E(n) in step 507. That is, the channel allocation method according to the present invention stores previous state values of respective channels, and changes a variation in channel state into a probabilistic variation model, thereby expecting the current channel state values.

Figure 6:
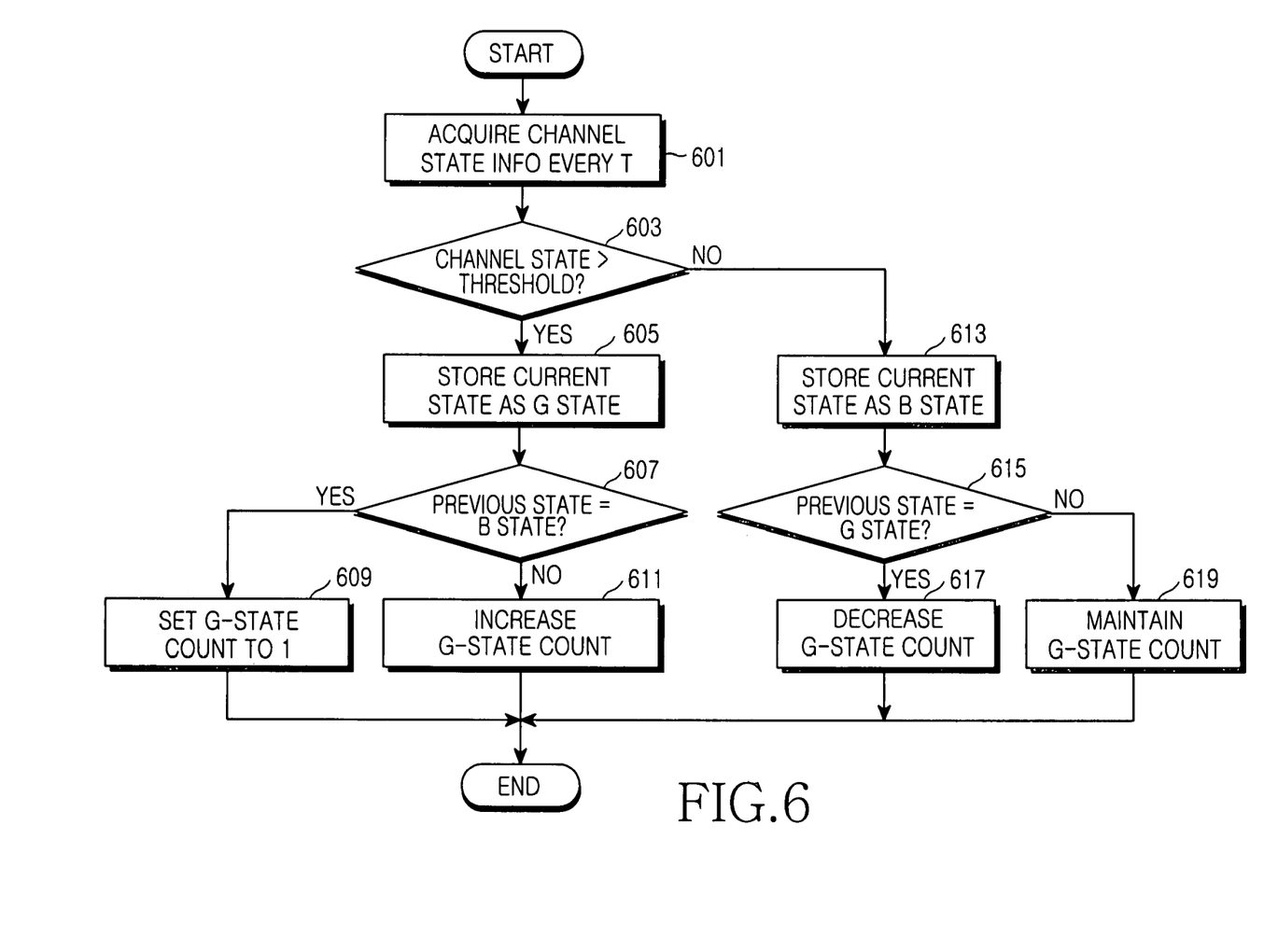
FIG. 6 is a flowchart illustrating a procedure for updating channel state values for subchannel allocation according to an embodiment of the present invention.

FIG. 6 is a flowchart illustrating a procedure for updating channel state values for subchannel allocation according to an embodiment of the present invention. Referring to FIG. 6, a base station acquires channel state information from the mobile stations every time interval T in order to allocate subchannels to the mobile stations in step 601. The channel state information, as described above, is information indicating channel states between the base station and the mobile stations, and can include an SNR or a signal power level.

Thereafter, the base station compares the received channel state values of the mobile stations with a predetermined threshold in step 603. That is, the base station compares an SNR or a received power level z(n), acquired every T, with a threshold R for the channel states. Herein, the threshold R is a value previously set in the system. When the threshold R is proportional to the SNR and the received power level, it is previously determined by calculating accuracy of channel coding. Therefore, the threshold R is previously determined such that a coded received signal can be modulated with an optimal bit length.

As a result of the comparison between the received channel state value and the threshold, if the channel state value exceeds the threshold, the base station stores the currently received channel state value as a G-state value in step 605. However, if the channel state value is not larger than the threshold, the base station stores the currently received channel state value as a B-state value in step 613. Accordingly, the comparison procedure is performed on the respective channel state values received from all the mobile stations.

The G-state value indicates that a corresponding mobile station has a Good channel state, and the B-state value indicates that a corresponding mobile station has a Bad channel state. That is, the G state means that it has a channel gain value higher than the threshold and the corresponding channel can perform optimal encoding.

Additionally, although the channel states are divided into two states of a G state and a B state in the embodiment of the present invention, the channel states can also be divided into three or more states through a modification of the embodiment of the present invention.

If it is determined that the current channel state is G state, the base station stores the current channel state value as a G-state value in step 605, and then determines if a previous channel state is a B state in step 607. If the previous channel state is a B state, the base station sets a G-state count to '1' in step 609, and if the previous channel state is not a B state, the base station increases the G-state count by 1 in step 611.

If it is determined in step 603 that the current channel state value is not larger than the threshold, i.e., that the current channel state is a B state, then the base station stores the current channel state value as a B-state value in step 613, and then determines if a previous channel state is a G state in step 615. If it is determined in step 615 that the previous channel state is a G state, the base station decreases the G-state count by 1 in step 617, and if the previous channel state is not a G state, the base station maintains the G-state count in step 619.

Table 1 below shows examples of the calculated G-state count values.

TABLE 1

| | Period | | | | | | | | | | | | |
|---|---|---|---|---|---|---|---|---|---|---|---|---|---|
| | 1 | 2 | 3 | ... | 9 | 10 | 11 | 12 | 13 | 14 | 15 | 16 | 17 | ... |
| Channel State | G | G | G | ... | G | G | B | B | B | G | G | G | G | ... |
| G-State Count | 1 | 2 | 3 | ... | 9 | 10 | 9 | 9 | 9 | 1 | 2 | 3 | 4 | ... |

Table 1 shows the G-state count values generated in the procedure illustrated in FIG. 6. For a period #1, because the channel state is a G state, the G-state count value becomes 1. Thereafter, if the channel state continuously maintains the G state until a period #10, the G-state count increases, preferably, one by one, to become 10 at the period 10.

If the channel state becomes a B state for a period #11, the G-state count decreases by 1 to become 9. Thereafter, if the channel states for periods #12 and #13 are B states, the G-state count value maintains 9. If the channel state transitions to a G state for a period #14, the G-state count value is set to 1. Thereafter, if the channel state continuously maintains the G state for succeeding periods, the G-state count value increases one by one.

In this procedure, the base station can determine the stored current channel state value and the current G-state count value. Therefore, the base station estimates the next channel state value in the following method using the stored current channel state value and the G-state count value.

Figure 7:
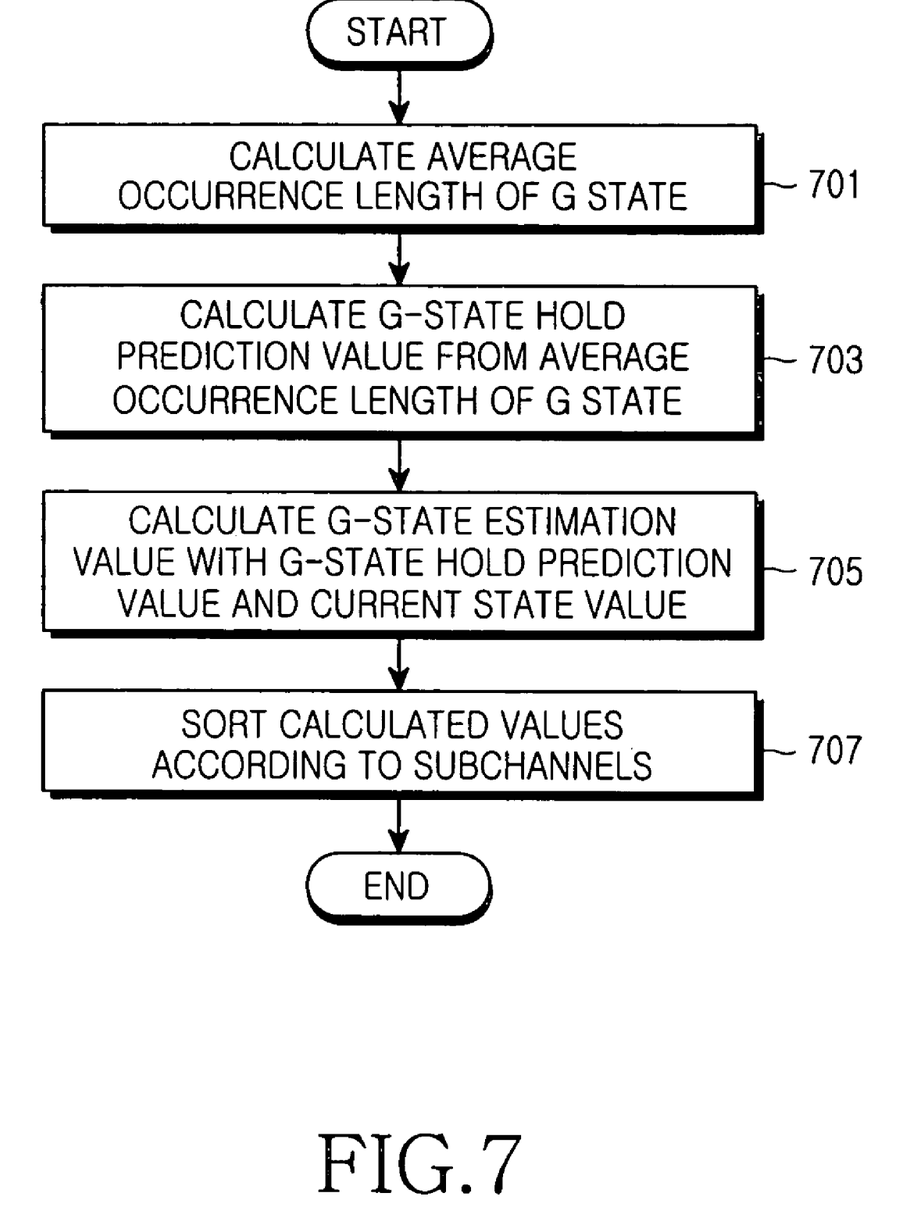
FIG. 7 is a flowchart illustrating a procedure for determining channel allocation priority according to an embodiment of the present invention.

FIG. 7 is a flowchart illustrating a procedure for determining channel allocation priority according to an embodiment of the present invention. Referring to FIG. 7, a base station first calculates an average occurrence length of the G state in step 701. If the channel state transitions from the B state to the G state, the base station calculates an average occurrence length of the G state for a predetermined period from G-state count values of the channel states stored for a previous time. If an average occurrence length of the G state for a subchannel #i for the current time n is defined as $A_i(n)$, the $A_i(n)$ can be expressed as shown in Equation (1).

$$A_i(n) = \frac{\text{Sum of G-State Count Values for Respective Events}}{\text{Number of G-State Events}} \quad (1)$$

With reference to Equation (1), if a period for which a channel state value is received from each of the mobile stations is defined as T, i.e., if it is assumed that the base station receives a channel state value every T, the G-state count value is determined in the foregoing method every T. In Equation (1), the term "G-state event" refers to a time for which a channel state transitions to the B state after transitioning to the G state, and the "number of G-state events" is determined by counting occurrences of the G-state events. For example, if the number of G-state events is 5 and G-state count values of the respective G-state events are 10, 8, 12, 13, and 7, the average occurrence length A(n) of the G state becomes 10 in accordance with Equation (1).

If the average occurrence length of the G state from the currently received channel state value in the foregoing method, the base station subtracts the currently stored G-state count value from the calculated average occurrence length of the G state and stores the subtraction result as a G-state hold prediction value W(n) in step 703. Therefore, the W(n) can be expressed as shown in Equation (2).

$$W_i(n) = A_i(n-1) - G_i(n) \quad (2)$$

Referring to Equation (2), because the W(n) is a value determined by subtracting the current G-state count value $G_i$ from the A(n) value, a value determined by subtracting the currently counted value from the average occurrence length of the G state. Therefore, a decrease in the W(n) value increases the average occurrence length, and an increase in the W(n) value decreases the average occurrence length. When the average occurrence length is reduced due to the increase in the W(n), there is high probability that the base station will hold at the current state. That is, as the W(n) value approaches the average occurrence length, there is high probability that the channel state will become the G state at a time of the next event.

In Equation (2), an A(n−1) value is used to calculate the W(n) value. That is, it is preferable to calculate a channel state prediction value at occurrence of the current event considering an average occurrence length A(n−1) at occurrence of up to the previous event. Therefore, the W(n) value is determined by subtracting the current G-state count value G(n) from the average occurrence length A(n−1) at occurrence of up to the previous event. For example, when the W(n) is calculated for a period #15 in Table 1, the A(n−1) is calculated based on an average occurrence length at occurrence of up to the previous event (i.e., occurrence of the previous event ends at a period #10). In calculating the A(n) value in the foregoing manner, the base station does not consider the G-state value when the channel state is the B state. In this case, therefore, the base station actually calculates the A(n) value considering only the average occurrence length of the G-state count value for up to the period #10.

More specifically, for example, it is assumed that an average occurrence length A(n−1) for the G state is 10 and the current G-state count value $G_i$ is 2 The W(n) value indicating that the channel state holds the G state for a time n becomes 8, approximating the average occurrence length A(n), such that it can be considered that there is probability that the channel state will hold at the G state for the next 8 periods. Therefore, there is high probability that the channel state will become the G state for the next period.

As another example, it is assumed that an average occurrence length A(n−1) for the G state is 10 and the current G-state count value $G_i$ is 9. In this case, the W(n) value indicating that the channel state holds the G state for a time n becomes 1, such that it can be considered that there is probability that the channel state will hold at the G state for the next one period. Therefore, there is high probability that the corresponding channel state will become the G state for the next period.

If the G-state hold prediction value W(n) is determined using Equation (2), the base station calculates a prediction value indicating that the channel state will become the G state at the next state, using the G-state hold prediction value and the current state value in step 705. If an estimation value indicting that the channel state will become the G state at the next time n is defined as E(n), the E(n) can be expressed as shown in Equation (3).

$$E_i(n) = \beta \cdot W_i(n-1) + (1-\beta) \cdot z_i(n-1) \quad (3)$$

That is, it is possible to obtain the estimation value E(n) of channel state information for the next time using Equation (3) from the W(n) value calculated in step 703 and the channel state information z(n−1). In Equation (3), it is possible to obtain the E(n) by applying a predetermined weight β to the channel state information z(n−1) and the W(n) value.

The weight β is defined as a value, which is larger than 0 and smaller than 1, and how much the channel state information will be reflected or how much the G-state hold prediction information will be reflected is determined depending upon a set value of the weight β.

If the prediction value $E_i(n)$ for the next channel state of each mobile station is determined in the foregoing manner, the base station sorts the determined $E_i(n)$ values in order of higher level in step 707. The base station sorts the $E_i(n)$ values in descending order of the number of subchannels to be allocated to the mobile stations.

As the calculated E(n) value increases, the corresponding channel has high probability that it will hold the Good channel state even for the next period (n+1). Herein, 'n' used in the forgoing processes represents the number of occurrences of a time period T (or a channel state measurement period). That is, 'n' represents points 1 to n where T occurs. Based on the sorted subchannel information, the base station allocates channels to the mobile stations according to requirements of the mobile stations, and transmits the channel allocation information to the mobile stations in the method described above.

As can be understood from the foregoing description, there are several possible methods of actually allocating subchannels using subchannel information sorted according to mobile stations, calculated according to an embodiment of the present invention, and the present invention proposes a method for predicting the next channel state from the previous channel state information separately stored for the mobile stations in order to allocate the subchannels.

The adaptive channel estimation algorithm proposed in the present invention is advantageous in that it probabilistically estimates the next channel state from previous channel state information, thereby reducing the number of exchanges of channel information messages for channel allocation. Therefore, when the number of mobile stations is large, the proposed adaptive channel estimation algorithm is effective in reducing system complexity required for the channel allocation. In addition, the adaptive channel estimation algorithm is advantageous in that it can efficiently use radio resources for a multimedia service.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for defining at least one subcarrier as a subchannel, dividing a total frequency band into a plurality of subchannels, and allocating the subchannels to at least one mobile station in an Orthogonal Frequency Division Multiple Access (OFDMA) wireless communication system, the method comprising the steps of:

receiving channel state information of the subchannels from the at least one mobile station;

comparing the received channel state information with a predetermined threshold;

determining a number of cases in which the received channel state information is greater than the predetermined threshold;

calculating an average occurrence length of the case in which the received channel state information is greater than the predetermined threshold, from the determined values separately stored for the subchannels for a predetermined period;

calculating a state hold prediction value for a next state of which a channel state information is greater than the threshold, from the calculated average occurrence length; and calculating an estimation value for the next state from the state hold prediction value and a current channel state value.

2. The method of claim 1, further comprises the steps of:

sorting the calculated estimation values according to an order based on levels of the subchannels; and allocating the subchannels according to the at least one mobile station in the sorted order.

3. The method of claim 1, wherein the channel state information includes a signal-to-noise ratio value measured from each of the at least one mobile station.

4. The method of claim 1, wherein the channel state information includes signal power measured from each of the at least one mobile station.

5. The method of claim 1, wherein the state hold prediction value is calculated by subtracting a current count value from the average occurrence length.

6. The method of claim 1, wherein the step of comparing the received channel state information with the predetermined threshold comprises the step of storing a current channel state as a G state, which indicates a good channel state, and counting a number of successive G states, if the received channel state information is greater than the threshold.

7. The method of claim 6, wherein the step of comparing the received channel state information with the predetermined threshold comprises the step of storing a current channel state as a B state, which indicates a bad channel state, and decreasing the accumulated count value, if the received channel state information is less than the threshold.

8. The method of claim 7, wherein the step of comparing the received channel state information with the predetermined threshold comprises the steps of:

storing the current channel state as the B state, if the received channel state information is less than the threshold; and initializing the accumulated count value, if a next channel state becomes the G state.

9. An apparatus for defining at least one subcarrier as a subchannel, dividing a total frequency band into a plurality of subchannels, and allocating the subchannels to at least one mobile station in an Orthogonal Frequency Division Multiple Access (OFDMA) wireless communication system, the apparatus comprising:

a subchannel allocator for comparing channel state information received from the at least one mobile station with a predetermined threshold, determining a number of cases in which the received channel state information is greater than the predetermined threshold, estimating a channel state value for a next time from the determined number of cases stored for a predetermined period, and allocating the subchannels for the at least one mobile station.

10. The apparatus of claim 9, wherein the channel state information comprises a signal-to-noise ratio value measured from each of the at least one mobile station.

11. The apparatus of claim 9, wherein the channel state information comprises signal power measured from each of the at least one mobile station.

12. The apparatus of claim 9, wherein the subchannel allocator calculates an average occurrence length of a case in which the received channel state information is greater than the predetermined threshold, from the determined number of cases separately stored for the subchannels for the predetermined period, calculates a state hold prediction value for a next state of which a channel state information is greater than the predetermined threshold, from the calculated average occurrence length, calculates an estimation value for the next state from the state hold prediction value and a current channel state value, sorts the calculated estimation values according to the subchannels in an order based on levels of the subchannels, and allocates the subchannels according to the at least one mobile station in the sorted order.

13. The apparatus of claim 9, wherein in comparing received channel state information with the predetermined threshold, the subchannel allocator stores a current channel state as a G state, which indicates a good channel state, and determines a number of successive G states, if the received channel state information is greater than the predetermined threshold.

14. The apparatus of claim 13, wherein in comparing received channel state information with the predetermined threshold, the subchannel allocator stores a current channel state as a B state, which indicates a bad channel state, and decreases the determined count value, if the received channel state information is less than the predetermined threshold.

15. The apparatus of claim 14, wherein in comparing received channel state information with the predetermined threshold, the subchannel allocator stores the current channel state as the B state, if the received channel state information is less than the predetermined threshold, and initializes the determined value, if a next channel state becomes a G state.

16. The apparatus of claim 9, further comprising a subchannel mapper for receiving subchannel allocation information determined by the subchannel allocator, and mapping user data transmitted to the at least one mobile station to respective input points of an inverse fast Fourier transform (IFFT) module according to the received subchannel allocation information.

17. A method for defining at least one subcarrier as a subchannel, dividing a total frequency band into a plurality of subchannels, allocating the subchannels to at least one mobile station, and receiving transmitted data using the allocated subchannels in an Orthogonal Frequency Division Multiple Access (OFDMA) wireless communication system, the method comprising the steps of:
  comparing channel state information received from the at least one mobile station with a predetermined threshold;
  counting a number of cases in which the received channel state information is greater than the predetermined threshold;
  estimating a channel state value for a next time from the counted values stored for a predetermined period;
  receiving subchannel allocation information allocated for the at least one mobile station; and
  selecting a subchannel allocated thereto from subchannels received through the received subchannel allocation information.

18. The method of claim 17, wherein the channel state information includes a signal-to-noise ratio value measured from the at least one mobile station.

19. The method of claim 17, wherein the channel state information includes signal power measured from the at least one mobile station.

20. An apparatus for defining at least one subcarrier as a subchannel, dividing a total frequency band into a plurality of subchannels, allocating the subchannels to at least one mobile station, and receiving transmitted data using the allocated subchannels in an Orthogonal Frequency Division Multiple Access (OFDMA) wireless communication system, the apparatus comprising:
  a subchannel selector for comparing channel state information received from the at least one mobile station with a predetermined threshold, counting a number of cases in which the received channel state information is greater than the predetermined threshold, estimating a channel state value for a next time from the counted values stored for a predetermined period, receiving subchannel allocation information allocated for the at least one mobile station, and selecting a subchannel allocated thereto from subchannels received through the received subchannel allocation information.

21. The apparatus of claim 20, wherein the channel state information comprises a signal-to-noise ratio value measured from the at least one mobile station.

22. The apparatus of claim 20, wherein the channel state information comprises signal power measured from the at least one mobile station.

* * * * *